Dec. 30, 1969  F. L. DI VITA ET AL  3,486,417
SEAT SUSPENSION ASSEMBLY
Filed March 4, 1968
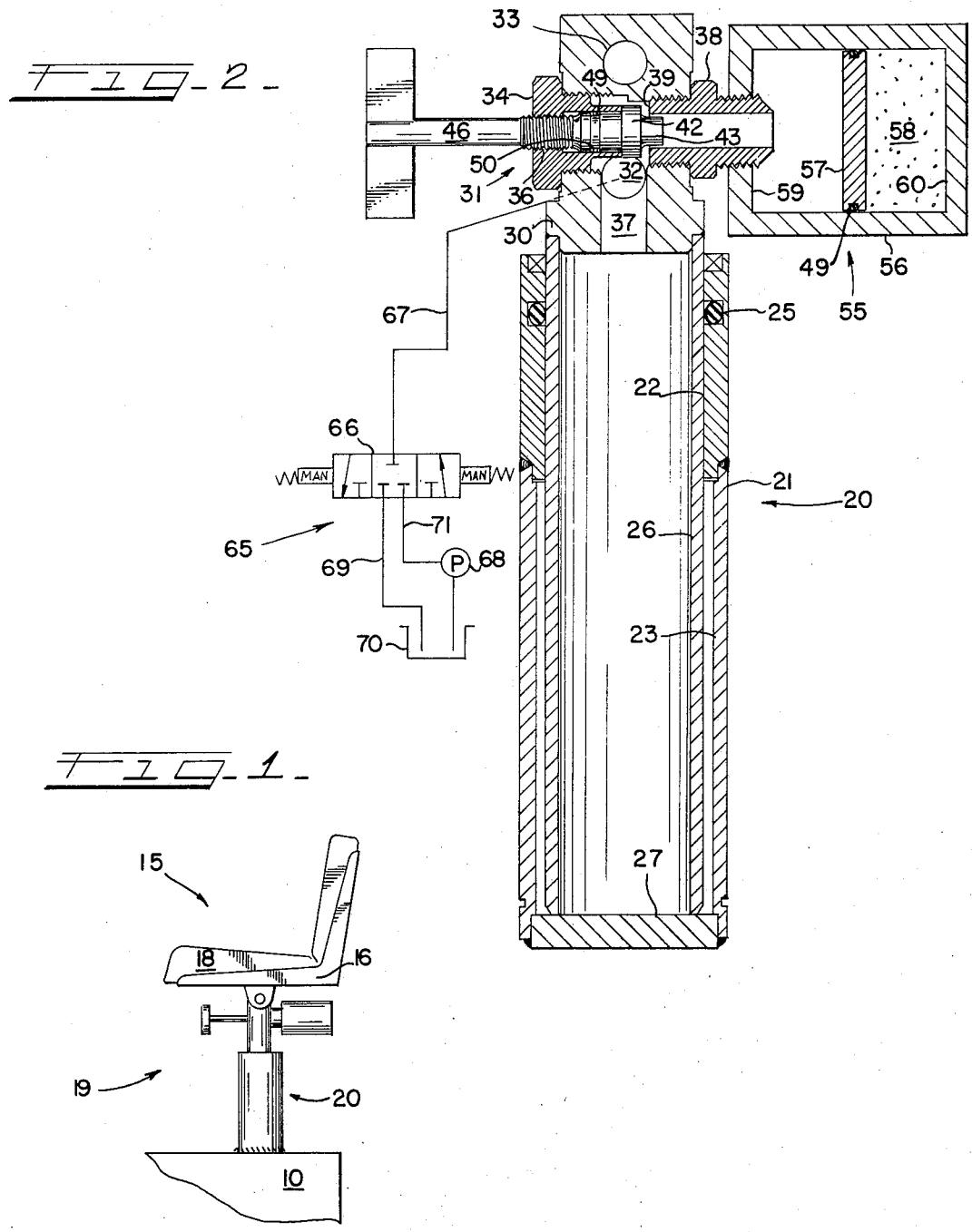
INVENTORS
FOSCO L. DI VITA
FRANK J. SIMAK
ANDREW N. D'ALESSANDRO
BY *Ronald C. Kamp* ATT'Y.

United States Patent Office 3,486,417
Patented Dec. 30, 1969

3,486,417
SEAT SUSPENSION ASSEMBLY
Fosco L. Di Vita, Chicago, Frank J. Simak, Hickory Hills, and Andrew N. D'Alessandro, Maywood, Ill., assignors to International Harvester Company, Chicago, Ill., a corporation of Delaware
Filed Mar. 4, 1968, Ser. No. 710,117
Int. Cl. F01b 15/00; F15b 11/08; A47c 1/02
U.S. Cl. 91—216    10 Claims

ABSTRACT OF THE DISCLOSURE

A suspension assembly for a vehicle seat having a hydraulic cylinder interconnected between the vehicle and the seat, resilient accumulator means responsive to fluid flow, a conduit connecting said hydraulic cylinder with the resilient accumulator means and a variable flow control means operatively connected to the conduit for controlling the rate of flow between the fluid motor and the resilient means.

BACKGROUND OF THE INVENTION

This invention relates to suspension devices for supporting a seat on a motor vehicle and more particularly to a mechanism for obtaining a cushioned, stabilized ride for the operator of the vehicle.

The prior art discloses a variety of devices designed for this purpose. Some of these devices utilize a hydraulic cylinder vertically situated between a seat and tractor in which the cylinder has a fluid conduit leading to an accumulator which provides resiliency to the system. As the cylinder telescopes inward due to an abnormal force caused by roughness of the terrain fluid is forced through the conduit and into the accumulator where it acts against a piston, diaphragm or bladder to compress a gas, such as nitrogen or air. In compression the gas stores the energy and upon a reduction of the abnormal force acting upon the seat, the fluid pressure is reduced and the gas expands driving fluid back into the hydraulic cylinder and expanding the chamber. The gas in the accumulator thus acts as a spring means which provides a cushioned ride for an operator of a vehicle. Such a system has limitations and disadvantages. For example, no suitable means has been provided for controlling the amplitude of the spring means during its response to vertical forces of varying magnitude acting upon the seat. The prior art would suggest a variation in the gas pressure within the accumulator which is a time consuming procedure and requires a suitable gas supply and valve means. Similarly, no satisfactory means of controlling the frequency of the spring vibrations is disclosed in the prior art.

To cope with these and other disadvantages and limitations our invention comprises a novel combination of a hydraulic cylinder disposed between a seat and a platform on the motor vehicle which is connected to an accumulator by a fluid conduit and in which is combined a resistor of varying magnitude.

Ideally a seat suspension assembly should provide a maximum degree of stability whereby the operator is maintained at a constant position relative to the tractor controls. Further, cushioning means should be interposed between the seat and the vehicle to prevent abrupt vertical displacements of the vehicle from being abruptly transferred to the operator. Accordingly, it is an object of this invention to provide a softly cushioned, suspension means which will obtain a maximum stabiity. It is a further object of our invention to provide a seat suspension assembly which may easily be manually adjusted to obtain the operator's preferred ride at a selected position relative to the tractor controls in terms of frequency of vibration of the system and amplitude of the vibration by a simple adjustment.

DESCRIPTION OF THE DRAWINGS

The manner in which the objects of the invention are obtained will be made clear by consideration of the following specification and claims when taken in conjunction with the accompanying drawings in which:

FIGURE 1 is a perspective view disclosing a preferred embodiment of the seat suspension system of our invention and its operative relationship to a motor vehicle; and FIGURE 2 is a side elevational view taken through a vertical centerline of the assembly.

DETAILED DESCRIPTION

As disclosed in the preferred embodiment of FIGURE 1, the seat suspension assembly 19 is vertically interposed between the sprung mass or seat 15 and the unsprung mass or vehicle support 10. The seat assembly 15 comprises a rigid base 16 on which is mounted a cushioning means 18 which conventionally may be formed of padding and coil springs. The seat itself forms no portion of this invention. The seat assembly 15 is connected by the supporting assembly 19 of this invention to a platform 10 which may be the transmission housing for a tractor or a suitable platform for a driver's station on a motor vehicle. This supporting assembly 19 comprises a fluid motor or hydraulic cylinder 20 suitably mounted between the support 10 and the seat 15 as by welding, brackets, a pin connection or other conventional means. The hydraulic ram-type cylinder 20 comprises a sleeve-like piston 26 mounted within an elongated tubular section 21 having an upper machined section 22 which provides close fitting contact with the piston element 26. Interposed between the upper section 22 and the piston element 26 is an O-ring 25 which prevents leakage from the chamber formed by the cylinder 21 and the piston 26. A lower elongated cylindrical section 23 may be welded to the upper section 22 and by this arrangement it will be observed that the lower cylindrical member 23 is not machined, thus effecting a reduction in cost. The elongated tubular cylinder 21 is closed at its bottom end by a circular plate 27 being welded thereto. The upper end of the piston sleeve 26 is provided with a transverse bore 33 for coupling the seat assembly 15 thereto by bolt or pin or other conventional means. Below this transverse bore 33 the piston 26 is shaped so as to provide a housing 30 for a variable flow resistor 31 operating within bore 37 later to be explained.

Operably connected to this housing 30 by threads is a nut union or coupler 38 which supports an accumulator 55 theron. The accumulator 55 may be defined by a tubular member 56 having closed ends 59, 60 except for a threaded orifice for coupling the accumulator 55 to the nut union 38. Within the accumulator is a cylindrical piston 57 having frictional engagement with the inner surface of the tubular member and having an O-ring 49 around its periphery for preventing the flow of any fluid to either side of the piston 57. The closed end 60 of the tubular member 61 may optionally be provided with a valve means (not shown) for placing a compressible gas such as nitrogen 58 within the compartment defined by the free piston 57, the tubular member 61 and the closed end 60 of the accumulator 55. It will be observed that the piston sleeve 26, the housing 30, the nut union or coupler 38 and the orifice to the accumulator defines a fluid conduit means.

As previously mentioned the upper end of the piston sleeve 26 forms a housing 30 for a variable flow resistor or valve 31. The variable flow resistor comprises a bonnet 34 which is threadably screwed into the valve housing 30 and within this bonnet is threadably mounted, as at 36, a valve stem or manual operating lever 46 for reciprocal action within said bonnet 34. Since it is mounted on the piston, the lever 46 is always in a definite, fixed juxtaposition to the seat 15 for easy accessibility to the driver. The valve stem 46 may be provided with an O-ring 49 suitably disposed in a groove 50 to maintain fluid tight contact with an unthreaded portion of the bonnet 34. Mounted upon one end of the valve stem 46 is a valve plug or closure member 42 which may be seated upon the inner end 39 of the coupler 38, this inner end 39 acting as a valve seat. Extending forwardly of the valve plug 42 is a cylindrical extension 43 which has a diameter less than the internal diameter of the coupler 38. Consequently, when the valve stem 42 is reciprocated within the bonnet 34 the extension 43 will reciprocate within the coupler 38; decreasing the area available for fluid flow as the extension 43 is moved to the right, as viewed in FIGURE 2, and increasing that area as the extension 43 is moved to the left. When the valve plug 42 is fully seated against the valve seat 39 no fluid can be communicated from the hydraulic ram-type cylinder 20 to the accumulator 55.

Below the valve housing 30 is an orifice or inlet port 32 to which is connected a hydraulic pressure regulating system 65. This system being somewhat conventional is described only schematically. It may comprise a three-way valve 66 to which is attached first a conduit 67 leading to the cylinder inlet 32. Also connected to the valve 66 by conduit 71 is a hydraulic pump 68 and an exhaust line 69, the latter being in communication with a sump 70. The sump 70 and pump 68 may be components of the hydraulic system providing fluid pressure to the remainder of the vehicle.

Thus it will be observed that a fluid supply is provided by the pump 68 to the hydraulic cylinder 20 and exhausted therefrom as desired. Further fluid may communicate between the accumulator 55 and the hydraulic cylinder 20 subject only to the forces of fluid friction and the position of the resistor 31. When the closure member 42 is not fully seated upon the valve seat 39 fluid may flow between the external surface of the valve extension 43 and the coupler 38. We have found that by the employment of this cylindrical extension 43 on the valve closure member 42 we can obtain a fluid flow rate between the accumulator 55 and the hydraulic cylinder 20 which is proportional to the degree of insertion of the extension 43 into the coupler 38, except when the valve is near the fully closed or fully opened position. By correlating the velocity of the fluid flow in direct proportion to a reciprocating movement of the valve stem 46, an operator of the vehicle may easily anticipate the amount of rotation of the valve stem 46 which is required to obtain a corresponding increase or reduction in fluid flow rate. Such in turn directly effects the cushioning capability and the stability of the ride.

MODE OF OPERATION

In operating the vehicle upon which this suspension assembly is operated the operator of the vehicle may utilize the control valve 66 to raise or lower the seat assembly 15 to a given height. This is done merely by positioning the valve 66 so as to condut fluid from the pump 68 to the cylinder 20 or by conducting fluid from the cylinder 20 via the exhaust line 69 to the sump 70. Once the piston sleeve 26 has been extended or contracted so as to carry the operator at his optimum desired height above the ground, the suspension assembly is designed to maintain this optimum height although the vehicle is operated under diverse terrain conditions. If the terrain is very smooth the operator may open the resistor 31 to the fully opened position such that little or no resistance exists to flow between the accumulator 55 and the hydraulic cylinder 20. In this condition the system has a maximum sensitivity while any roughness in the terrain will be transmitted to the operator of the vehicle with a cushioning effect of maximum amplitude. Greater variations in surface terrain will cause corresponding greater amplitudes in the cushioning response. To dampen the amplitude of the response provided by the compressed gas the operator of the vehicle may merely rotate valve stem 46 to reduce both the rate of fluid flow between the accumulator 55 and the hydraulic cylinder 20 and the amount of fluid displaced from one chamber to the other. Since the force displacing the cylinder is applied over a discrete time interval, the flow of fluid from the cylinder into the accumulator will encounter a resistance at the extension 43. If the time interval is short, as it will be for a vehicle traversing rough terrain, the force will not be applied long enough to expel a large volume of the fluid into the accumulator, thereby limiting the amplitude of the seat movement. Consequently, it will be observed that the operator may directly control the amplitude of the cushioning effect of the seat suspension assembly. Further assuming that the variations in ground surface intensify not only in height but in frequency, the resistor means has a unique ability to reduce the frequency of cushioning effect delivered to the operator. Dynamically the fluid flowing in both directions between accumulator and cylinder encounters a pressure drop at the resistor. A small time interval is again needed to permit equalization of pressure on both sides of the resistor. The frequency of oscillation is damped because the chamber to which fluid will begin to flow at high frequencies will already be at an elevated pressure level. This results also from a reduction in fluid flow since the system is less sensitive and will less readily reflect the numerous vibrations of the tractor vehicle as it moves across the surface.

We claim:
1. A suspension assembly for supporting a sprung mass upon an unsprung mass comprising:
 (a) a fluid motor adapted for interposition between the sprung mass and the unsprung mass,
 (b) resilient means responsive to fluid pressure,
 (c) conduit means for permitting fluid flow between the fluid motor and the resilient means,
 (d) variable flow resistor means within said conduit for selectively and incrementally controlling the rate of fluid flow between the resilient means and fluid motor.

2. A suspension assembly defined in claim 1 in which said variable flow resistor comprises:
 (a) A housing surrounding said conduit,
 (b) Manually operable obstructing means mounted for reciprocal movement within said housing for restricting the rate of fluid flow.

3. A suspension assembly for supporting a seat upon a vehicle comprising:
 (a) A fluid motor adapted for interconnection between the vehicle and the seat,
 (b) A resilient means responsive to fluid flow,
 (c) A conduit connecting said fluid motor and said resilient means,
 (d) Variable flow control means operatively connected to said conduit for incrementally controlling the rate of flow between the fluid motor and the resilient means.

4. A suspension assembly as defined in claim 3 in which the variable flow control means comprises:
 (a) A housing connected to the seat and to the fluid motor through which said conduit means passes,
 (b) A valve acting upon said conduit means, said valve having manual operating means extending outward of said housing in fixed juxtaposition with the seat.

5. A suspension assembly as defined in claim 3 in which the variable flow control means comprises:
 (a) A housing connected to the seat and to said fluid motor having an internal surface defining the fluid conduit,
(b) A valve seat and valve closure member,
(c) A valve stem operably connected to said closure member and said housing,
(d) Correlative structural means on said valve closure member for obtaining a reduction of fluid flow rate directly proportional to the extent of movement of the valve stem.

6. In a suspension assembly for a vehicle seat having a fluid motor and accumulator and a fluid conduit interconnecting the fluid motor and the accumulator, the improvement comprising:
(a) A valve housing mounted between the fluid motor and the seat having an internal surface defining conduit between the motor and accumulator,
(b) A valve seat within said housing,
(c) Valve closure means having manually operable means for manipulating said closure.

7. A suspension assembly as defined in claim 6 in which said valve closure means comprises means correlated with said threaded engagement of the manually operable means with the housing for directly proportioning the resilience of the accumulator with movement of the manually operable means.

8. A suspension assembly as defined in claim 6 in which said valve closure means comprises:
(a) An elongated cylindrical member extending from an annular flange having a lesser diameter than said valve seat whereby the elongated cylindrical member may be extended within the valve seat when the annular flange rests upon the valve seat.

9. A suspension assembly for supporting a seat upon a vehicle platform comprising:
(a) A hydraulic cylinder adapted for interconnection between the vehicle and the seat, (b) An accumulator positioned on said hydraulic cylinder,
(c) A conduit connecting said hydraulic cylinder and said accumulator,
(d) Variable flow resistor means operatively connected to said conduit for controlling the rate of flow between the hydraulic cylinder and the accumulator,
(e) Lever means attached to said variable flow resistor means in a fixed juxtaposition with said seat for easy accessibility to an operator of the vehicle.

10. A suspension assembly as defined in claim 9 including:
(a) Conduit means extending from the hydraulic cylinder to the hydraulic system of a vehicle,
(b) Directional control means interposed between the hydraulic cylinder and the hydraulic system of the vehicle whereby fluid may be added or deleted from the suspension assembly as desired.

References Cited

UNITED STATES PATENTS

| | | | |
|---|---|---|---|
| 743,508 | 11/1903 | Hornung | 91—469 |
| 819,988 | 5/1906 | Gerdou | 91—469 |
| 2,938,346 | 5/1960 | Grotzmuller | 92—13 X |

FOREIGN PATENTS

| | | |
|---|---|---|
| 767,957 | 9/1967 | Canada. |

PAUL E. MASLOUSKY, Primary Examiner

U.S. Cl. X.R.

91—469; 92—134; 297—330; 267—117